United States Patent [19]

Sammon

[11] Patent Number: 4,614,457

[45] Date of Patent: Sep. 30, 1986

[54] COUPLING MECHANISM

[76] Inventor: James P. Sammon, 12608 Crossburn Ave., Cleveland, Ohio 44135

[21] Appl. No.: 755,017

[22] Filed: Jul. 15, 1985

[51] Int. Cl.⁴ .............................................. F16D 1/00
[52] U.S. Cl. ................................... 403/322; 403/328; 81/177.85
[58] Field of Search ....................... 403/324, 322, 328; 411/348; 81/177.85

[56] References Cited

U.S. PATENT DOCUMENTS

| | | | |
|---|---|---|---|
| 2,009,371 | 7/1935 | Junge | 403/328 |
| 2,107,581 | 2/1938 | Parsons et al. | |
| 2,136,190 | 11/1938 | Gulfelt | |
| 2,500,420 | 3/1950 | Koning | |
| 3,208,318 | 9/1965 | Roberts | |
| 3,467,231 | 9/1969 | Haznar | |
| 3,532,013 | 10/1970 | Haznar | |
| 4,218,940 | 8/1980 | Main | 81/177.85 X |

FOREIGN PATENT DOCUMENTS 499858 6/1936 Fed. Rep. of Germany ...... 411/348

Primary Examiner—Andrew V. Kundrat

[57] ABSTRACT

A coupling mechanism is disclosed for a male member to couple with a female member. The male member may be a handle or extension with a tool driver end, and the female member may be a socket wrench, as an example. The male member has a detent member which is movable laterally in a recess near a first end of the male member. A transverse pin is slideable in a transverse aperture removed from the first end and is coupled by linkage means with the detent member. The linkage means includes a cam and a cam follower acting on the detent member and a spring acts through the linkage means on the detent member. When the transverse pin is pushed into a first position this establishes the detent member urged laterally outwardly by the spring through the cam and follower. When the transverse pin is manually moved to a second opposite position the detent member is permitted to move laterally inwardly to uncouple the male and female members. The foregoing abstract is merely a resume of one general application, is not a complete discussion of all principles of operation or applications, and is not to be construed as a limitation on the scope of the claimed subject matter.

19 Claims, 5 Drawing Figures

COUPLING MECHANISM

BACKGROUND OF INVENTION

The invention is directed to a coupling mechanism for coupling together male and female members. One example where such a coupling mechanism has previously been proposed is in a ratchet wrench having a square male driver end to receive a square female aperture in a socket wrench. In such case a spring urged detent ball has been used in the male tool driver end to engage a lateral recess in the wall of the female socket wrench. This is shown in U.S. Pat. No. 3,467,231. A quick release for relieving the detent ball pressure and, hence, relieving the socket wrench has been suggested in U.S. Pat. Nos. 3,208,318 and 3,532,013. In these latter two patents a manually movable longitudinal pin was utilized to effect the release. This necessitated a short driver end to accommodate the longitudinal pin.

U.S. Pat. No. 2,136,190 showed a laterally movable detent but this was in the female member to hold a male tool. Similar structures were proposed in U.S. Pat. Nos. 2,107,581 and 2,500,420.

The problem to be solved, therefore, is how to construct a coupling mechanism for a male and female member wherein the coupling mechanism may be used with a long male member such as a shaft wherein it is impracticable to provide in the shaft a long longitudinal pin which may be directly manually actuated.

SUMMARY OF THE INVENTION

This problem may be solved by a coupling mechanism to couple a male to a female member, said coupling mechanism comprising, in combination: a detent member movable laterally in a recess near a first end of said male member; a transverse pin slideable in a transverse aperture in said male member at a position removed from said first end of said male member, linkage means acting between said transverse pin and said detent member; a cam and a cam follower in said linkage means acting on said detent member; urging means acting through said linkage means on said detent member; and said transverse pin having lateral travel in opposite directions into first and second opposite positions; said first position of said transverse pin establishing said detent member urged laterally outwardly adapted for coupling engagement with a lateral wall of said female member, and said second position of said transverse pin permitting said detent member to move laterally inwardly to uncouple said male and female members.

Accordingly, an object of the invention is to provide a coupling mechanism which may be used with a long male member.

Another object of the invention is to provide a coupling mechanism between a male and a female member wherein a detent member is laterally urged outwardly under the action of a cam and follower for an added mechanical advantage.

Another object of the invention is to provide a coupling mechanism between a male and a female member wherein a transverse pin may be manually moved for the coupling and uncoupling function.

Another object of the invention is to provide a coupling mechanism wherein a transverse pin has a secondary function of a pivot pin between a male driver end and a handle.

Another object of the invention is to provide a coupling mechanism which may provide a positive locking action between a male and a female member.

Other objects and a fuller understanding of this invention may be had by referring to the following description and claims, taken in conjunction with the accompanying drawings.

DESCRIPTION OF THE PREFERRED EMBODIMENTS

Figure 1:
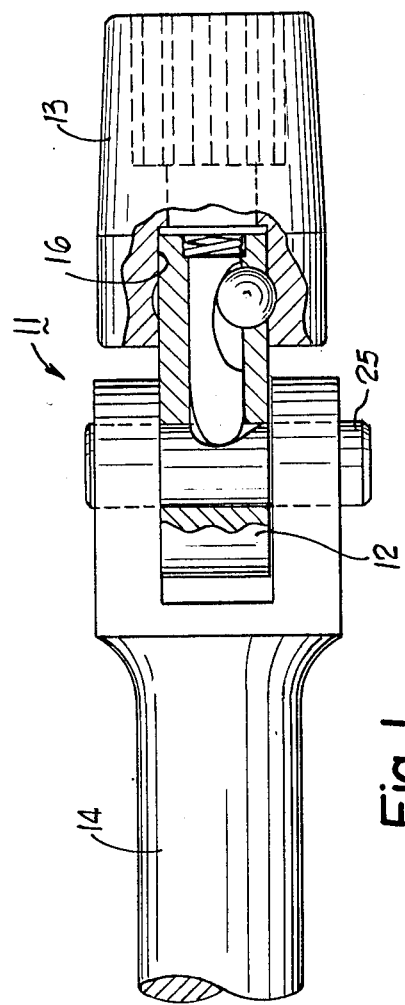
FIG. 1 is a plan view partially in section of a coupling mechanism according to the invention.
Figure 2:
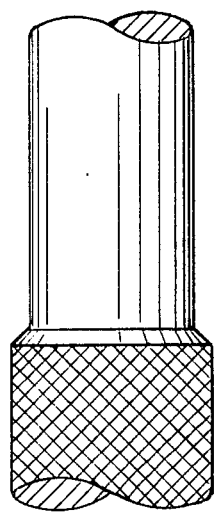
FIG. 2 is a front view of the coupling mechanism of FIG. 1.
Figure 2:
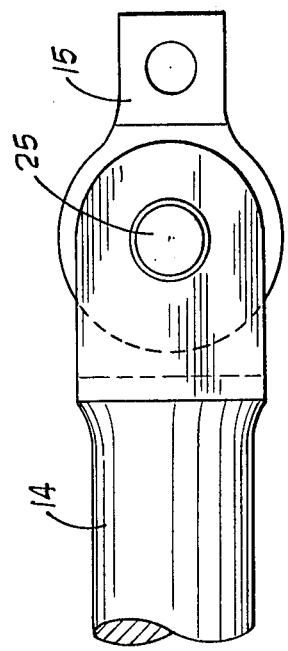
Figure 3:
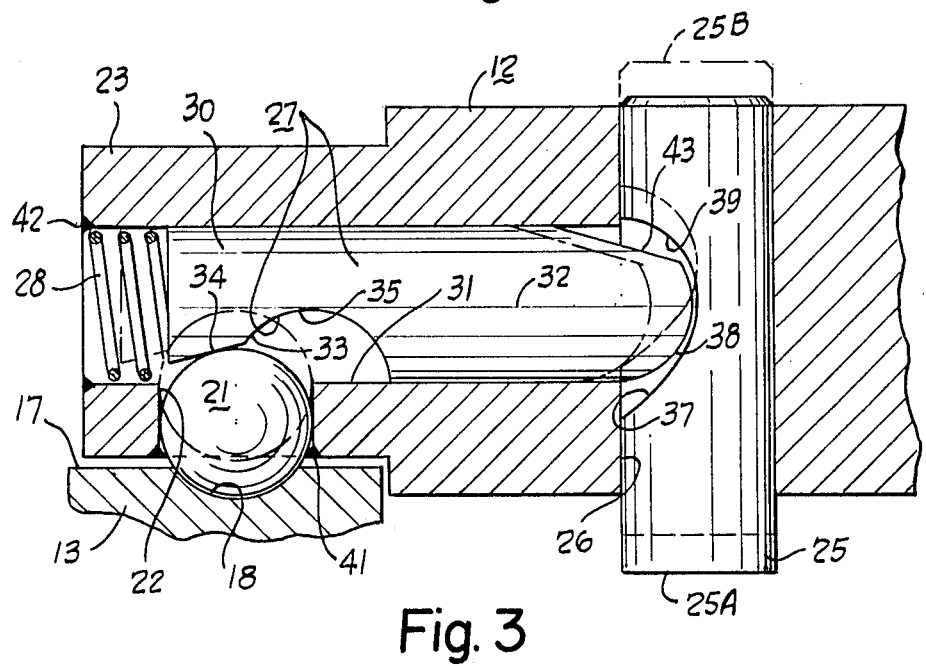
FIG. 3 is an enlarged longitudinal sectional view of the coupling mechanism.

FIGS. 1, 2 and 3 illustrate a first embodiment of the invention of a coupling mechanism 11 which may be used to couple a male member 12 and a female member 13. The male member may be one which has a long shaft or otherwise is one in which a long longitudinal aperture is impractical. One example of this coupling mechanism 11 is shown in FIG. 1 wherein a breaker bar handle 14 is pivoted to the male member 12 which in turn has a driver end 15 which is non-circular. The typical breaker bar may be used with a socket wrench as the female member 13 and this socket wrench has a complementary female aperture 16 with a side wall 17 and a laterally directed recess 18. A typical socket wrench 13 has a square cross section female aperture 16 and the breaker bar 14 has a pivoted connection to the driver end 15. This driver end is also square in cross section to be complementary to the female aperture 16 and to transfer torque thereto. The laterally directed recess 18 is usually provided in the socket wrench 13 and may be merely a recess or in some brands may be an aperture completely through the side wall 17 to the outside surface of the socket wrench. This recess, in the prior art, typically receives a spring urged ball detent in a tool driver.

Figure 5:
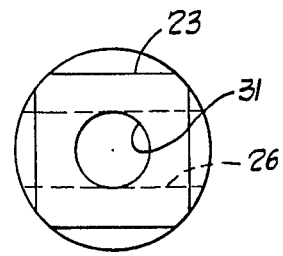
FIG. 5 is an end view of the modification shown in FIG. 3.

The coupling mechanism 11 is principally in the male member 12 and this is better illustrated in FIG. 3. A detent member 21, which in this case is a detent ball, is movable laterally in a lateral recess 22 in a first end 23 of the male member 12. A transverse pin 25 is slideable in a transverse aperture 26 at a position removed from the first end 23 of the male member 12. Linkage means 27 is provided to act between the transverse pin 25 and the detent member 21. Urging means in the form of a spring 28 acts through the linkage means 27 on the detent member 21. The detent ball 21 is held in the first end of the male member 12 by a ring stake 41 and the spring 28 is held in the exposed end of the longitudinal aperture 31 by a ring stake 42. The linkage means 27 includes a longitudinal pin 30 which is movable longitudinally or substantially longitudinally in a longitudinal aperture 31. This longitudinal pin may be off the axis 32 of the male member 12 if more space for the parts is needed, but in FIGS. 1 and 5 is shown as being coaxial. The linkage means 27 further includes a cam 33 and a cam follower 34. In FIG. 3 this cam 33 is shown as being on a recess 35 on the longitudinal pin 30 near the first end 23 of the male member 12. The cam follower 34 is a part of the inner surface of the detent ball 21. A second cam 37 and a second cam follower 38 are also provided in the linkage means 27. The second cam 37 is on a recess 39 in the transverse pin 25 and the second cam follower 38 is on the inner end of the longitudinal pin 30. The inner end of the longitudinal pin 30 may have a chamfer 43 for improved clearance with the recess 39. Both the transverse pin 25 and the longitudinal pin 30 are preferably cylindrical except for the cam surfaces therein. This makes for easy manufacture and assembly.

In assembly, the transverse pin 25 is first slid into the transverse aperture 26. The longitudinal pin 30 is next inserted and then the spring 28 staked in place. The detent ball 21 is next inserted and staked in place for a simple and economical assembly.

The coupling mechanism 11 may be used to couple most any male member to a female member wherein a locking or coupling engagement is desired. With a non-circular cross section of the male member 12 and complementary shape on the female member 13, torque may be transferred therebetween. This coupling mechanism may be used on a long power shaft, to couple to various tools or appliances. As illustrated, it is used in a breaker bar 14 wherein the driver end 15 is pivoted to the breaker bar handle. This is a typical tool in a mechanic's tool chest to be able to apply torque to the socket wrench 13 at many different angles of the driver end 15 relative to the handle 14. In FIG. 1 the transverse pin 25 serves a double purpose of also providing the pivot pin between the driver end 15 and the breaker bar handle 14 or a long shaft. The breaker bar is like part of a universal joint, with which the invention may also be used. In some brands of breaker bars there may be a detent ball between handle 14 and the circular head of driver end 15, and in other brands there may be a spring like a Bellevile washer on the pivot pin.

The operation of the coupling mechanism is achieved by the transverse pin 25 having lateral travel in opposite directions into first and second opposite positions 25A and 25B. The first lateral position 25A is shown in solid lines in FIG. 3 and establishes the detent member 21 urged laterally outwardly. FIG. 3 shows this detent ball 21 urged outwardly to about its maximum extent as would be the case with a badly worn socket wrench 13. The dot-dash lines on FIG. 3 illustrate the second lateral position 25B of this transverse pin permitting the detent member 21 to move laterally inwardly to uncouple the male member 12 from the female member 13. To revert to the coupled position 25A shown in solid lines, it will be noted that preferably the second cam 37 does not engage the second cam follower 38 even with a badly worn socket wrench 13. The urging of the spring 28 moves the longitudinal pin 30 inwardly so that the first cam 33 is in locking or substantially locking engagement with the detent ball 21. This provides a mechanical advantage of the force of the spring 28 to positively lock together the male and female members, where the female member has the laterally directed recess 18. This locking function is an advantage over the spring urged ball detent of the prior art. Where an extension, breaker bar or speed wrench is used with this invention to hold a tool, e.g. a socket wrench, and place it in a restricted location into which a mechanic cannot reach with his hand, he does not want the socket wrench to pull off, as it could with the prior art extensions. Such extensions have such a long length that it is impractical to have a manually actuated longitudinal pin therein, as in U.S. Pat. No. 3,208,318. When the transverse pin 25 is moved to the second position 25B, then the second cam 37 pushes on the second cam follower 38 and moves the longitudinal pin outwardly so that the ball 21 may fall into the recess 35 and, hence, the male and female members are uncoupled.

Figure 4:
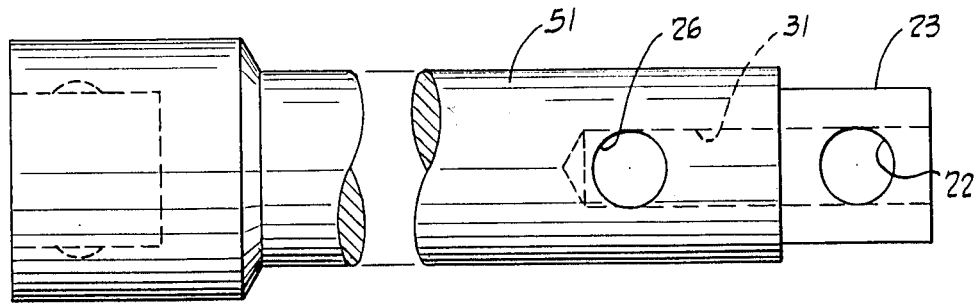
FIG. 4 is a plan view of a modification.

The embodiment of FIGS. 4 and 5 show an extension 51 which may be an extension for a ratchet handle to drive a socket wrench 13, as shown in FIG. 1. In FIG. 4 the extension 51 is shown with the circular lateral aperture 22, the transverse aperture 26 and the longitudinal aperture 31, ready to receive the detent ball 21, transverse pin 25 and longitudinal pin 30, respectively. Also, this extension has the square driver end or first end 23 to provide torque to the socket wrench 13. FIG. 5 shows this square first end 23. The coupling mechanism 11 may also be provided on a speed wrench for example, not shown, which is similar to the extension 51 but which has a crank handle for rapid turning of the first end 23. A speed wrench and the extension 51 are examples of utilizing the coupling mechanism 11 on a tool or male member which has a long shaft wherein it is impractical, or impossible in the case of the extension of FIG. 3, to have a manually actuated longitudinal pin as in the prior art U.S. Pat. No. 3,208,318. The breaker bar of FIGS. 1 and 2 is an example where the coupling mechanism is advantageous even though a long male member is not used, but again the manually actuated longitudinal pin of the prior art cannot be used. It cannot be used because of the pivot pin 25 with which it would interfere. In the present invention of FIGS. 1 and 2 this pivot pin 25 serves the second function of the transverse pin which establishes coupling and uncoupling of the male and female members.

It will be noted that the spring 28 is positioned to act on the longitudinal pin 30 which, in turn, acts through the cam 33 onto the detent member 21. This urges this detent member laterally outwardly. If the socket wrench 13 is one which has no lateral recess 18, then this outward urging of the detent member merely provides a very substantial frictional force coupling together the male and female members against longitudinal separation. Where the female socket has this lateral recess 18, the male and female members are positively locked together. When the transverse pin 25 is moved to the second position 25B, the longitudinal pin 30 is moved outwardly to increase the stress on the spring 28 and this permits the detent member 21 to fall inwardly or be moved inwardly by pulling off the socket wrench 13. The transverse pin 25 is slideable in the transverse aperture 26 but is trapped in this aperture by the second cam follower 38. The transverse pin 25 may be spring urged in the locking direction, if desired, but in any case this trapping precludes loss of the transverse pin.

FIGS. 1 and 3 illustrate a typical structure of the invention, where the transverse pin does not extend very far out of the transverse aperture, and hence does not interfere with the rotation of the wrench. It will also be noted that the parts of the coupling mechanism are close to the central axis 32 so that the coupling mechanism may be readily dynamically balanced, in case the mechanism is used on a high speed shaft.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A coupling mechanism to couple a male to a female member, said coupling mechanism comprising, in combination:
    an elongated shaft having said male member at a first end thereof and having a second end remote from said first end;
    a longitudinal axis of said elongated shaft;
    said elongated shaft adapted to be rotated about its said longitudinal axis to impart rotation to said male and female members about said longitudinal axis;
    a detent member in said coupling mechanism movable laterally in a recess in said male member;
    a transverse pin slidable transverse to said longitudinal axis in a transverse aperture in said male member at a position close to said female member;
    linkage means acting between said transverse pin and said detent member;
    a can and a cam follower in said linkage means acting on said detent member;
    urging means acting through said linkage means on said detent member; and
    said transverse pin having lateral travel in opposite directions into first and second opposite positions;
    said first position of said transverse pin establishing said detent member urged laterally outwardly adapted for coupling engagement with a lateral wall of said female member, and said second position of said transverse pin permitting said detent member to move laterally inwardly to uncouple said male and female members.

2. A coupling mechanism as set forth in claim 1, wherein said male member is a tool driver and said female member is a tool.

3. A coupling mechanism as set forth in claim 1 wherein said male member has said first end which is non-circular in transverse cross-section to couple with a female member of complementary shape and to transfer torque thereto.

4. A coupling mechanism as set forth in claim 1, wherein said detent member is a ball.

5. A coupling mechanism as set forth in claim 4, wherein said detent ball is held in and movable in a lateral recess near said first end of said male member.

6. A coupling mechanism as set forth in claim 1, wherein said cam follower is on said detent member.

7. A coupling mechanism as set forth in claim 1, wherein said linkage means includes a substantially longitudinal pin disposed along said longitudinal axis of rotation.

8. A coupling mechanism as set forth in claim 7, wherein said substantially longitudinal pin acts between said transverse pin and said detent member.

9. A coupling mechanism as set forth in claim 8, wherein said urging means acts on said substantially longitudinal pin.

10. A coupling mechanism as set forth in claim 7, wherein said cam is on said substantially longitudinal pin.

11. A coupling mechanism as set forth in claim 10, wherein said urging means is positioned to act on said substantially longitudinal pin which in turn acts through said cam to said detent member and urge it laterally outwardly in said first position of said transverse pin.

12. A coupling mechanism as set forth in claim 11, wherein said transverse pin in said second position thereof coacts with said substantially longitudinal pin to stress said urging means and permit said detent member to move laterally inwardly.

13. A coupling mechanism as set forth in claim 1, wherein said transverse pin has a second cam acting on a second cam follower in said linkage means.

14. A coupling mechanism as set forth in claim 13, wherein said second cam engages said second cam follower in the movement of said transverse pin from said first to said second position.

15. A coupling mechanism as set forth in claim 14, wherein said transverse pin is slideable in a transverse through-hole in said male member; and
    said linkage means traps said transverse pin in said transverse through-hole to preclude loss of said transverse pin.

16. A coupling mechanism as set forth in claim 1, wherein said cam and cam follower provide a mechanical advantage in the force urging said detent member laterally outwardly.

17. A coupling mechanism as set forth in claim 1, wherein in said cam and cam follower are adapted to provide a locking action on said detent member in said first position of said transverse pin.

18. A coupling mechanism to couple a male to a female member, said coupling mechanism comprising, in combination:
    a detent member movable laterally in a recess near a first end of said male member;
    a transverse pin slidable in a transverse aperture in said male member at a position removed from said first end of said male member;
    linkage means acting between said transverse pin and said detent member;
    a cam and a cam follower in said linkage means acting on said detent member;
    urging means acting through said linkage means on said detent member;
    said transverse pin having lateral travel in opposite directions into first and second opposite positions;
    said first position of said transverse pin establishing said detent member urged laterally outwardly adapted for coupling engagement with a lateral wall of said female member, and said second position of said transverse pin permitting said detent member to move laterally inwardly to uncouple said male and female members;
    said male member being pivoted to a shaft; and
    said transverse pin serving a second function of a pivot pin between said male member and said shaft.

19. A coupling mechanism as set forth in claim 1, wherein said transverse pin is slideable in a transverse through-hole in said male member; and
    said transverse pin having a length sufficiently short that one end thereof is substantially flush with said shaft in said first position of said transverse pin, and the other end thereof is substantially flush with the opposite side of said shaft in said second position of said transverse pin.

* * * * *